United States Patent [19]

Huang

[11] Patent Number: 5,798,689

[45] Date of Patent: *Aug. 25, 1998

[54] TIRE PRESSURE INDICATOR

[76] Inventor: Tien-Tsai Huang, No. 4, Lane 30, Wu-Chuan St., Pan-chiao City, Taipei Hsien, Taiwan

[*] Notice: The term of this patent shall not extend beyond the expiration date of Pat. No. 5,694,111.

[21] Appl. No.: 806,408

[22] Filed: Feb. 26, 1997

Related U.S. Application Data

[63] Continuation-in-part of Ser. No. 773,000, Dec. 23, 1996, Pat. No. 5,964,111.

[51] Int. Cl.$^6$ .................................................. B60C 23/00
[52] U.S. Cl. .......................... 340/447; 340/442; 340/445; 340/539; 340/626; 73/146.2; 73/146.3; 73/146.4; 73/146.5; 116/34 R
[58] Field of Search ....................... 340/442, 447, 340/445, 539, 626; 73/146.5, 146.4, 146.2, 146.3; 137/227, 231; 116/34 R; 200/61.22, 61.25

[56] References Cited

U.S. PATENT DOCUMENTS

| | | | |
|---|---|---|---|
| 4,048,614 | 9/1977 | Shumway | 340/447 |
| 4,507,956 | 4/1985 | Schlesinger et al. | 73/146.5 |
| 4,768,375 | 9/1988 | Eckardt et al. | 73/146.5 |
| 5,109,213 | 4/1992 | Williams | 340/447 |
| 5,119,066 | 6/1992 | Ballyns | 340/442 |
| 5,637,926 | 6/1997 | Zedonis | 307/10.1 |

*Primary Examiner*—Jeffery A. Hofsass
*Assistant Examiner*—Julie Lieu
*Attorney, Agent, or Firm*—Oblon, Spivak, McClelland, Maier & Neustadt, P.C.

[57] ABSTRACT

A pressure gauge of a tire pressure indicator for a set of pneumatic tires of a vehicle includes a casing formed with an aperture and adapted to be secured to a metal wheel of a respective one of the pneumatic tires such that the casing is concealed by the respective one of the pneumatic tires, and a signal generating device disposed in the casing. The signal generating device wirelessly transmits a pressure signal when pressure within the respective one of the pneumatic tires is not within a predetermined normal operating pressure range.

18 Claims, 9 Drawing Sheets

TIRE PRESSURE INDICATOR

CROSS-REFERENCE TO RELATED APPLICATION

This is a continuation-in-part (CIP) of U.S. patent application Ser. No. 08/773,000 now U.S. Pat. No. 5,964,111, filed on Dec. 23, 1996.

BACKGROUND OF THE INVENTION

1. Field of the Invention

The invention relates to a tire pressure indicator, more particularly to a tire pressure indicator having pressure gauges for monitoring a set of pneumatic tires of a vehicle.

2. Description of the Related Art

U.S. Pat. No. 5,289,161 discloses a tire pressure indicator for a set of pneumatic tires of a vehicle. The tire pressure indicator is capable of generating an alarm signal whenever a tire is under- or over-inflated, and comprises a plurality of pressure gauges and a receiver device. The pressure gauges are attached to the inflating valves of the pneumatic tires. As such, they are exposed to the risk of impact, and are easily lost or stolen.

SUMMARY OF THE INVENTION

Therefore, the object of the present invention is to provide a tire pressure indicator with an improved pressure gauge which is capable of overcoming the drawback associated with the aforementioned prior art.

Accordingly, the tire pressure indicator is adapted for use with a set of pneumatic tires of a vehicle, each of the pneumatic tires having a metal wheel. The tire pressure indicator comprises: a plurality of pressure gauges, each of which includes a casing formed with an aperture and adapted to be secured to the metal wheel of a respective one of the pneumatic tires such that the pressure gauges are concealed by the pneumatic tires, and a signal generating device disposed in the casing, the signal generating device wirelessly transmitting a pressure signal when pressure within the respective one of the pneumatic tires is not within a predetermined normal operating pressure range; and a receiver device for receiving the pressure signal transmitted by the signal generating device of the pressure gauges.

In one embodiment, each of a plurality of elastic straps is adapted to be extended around the metal wheel of a respective one of the pneumatic tires and secures the casing of a respective one of the pressure gauges on the metal wheel of the respective one of the pneumatic tires. Preferably, each of the elastic straps has opposite ends that are provided with hook units, and the casing of each of the pressure gauges is formed with retaining holes for engaging the hook units on the respective one of the elastic straps.

In another embodiment, the casing of each of the pressure gauges is provided with an externally threaded coupling tube. Each of a plurality of coupling seats is formed with an internally threaded hole for engaging the coupling tube on the casing of a respective one of the pressure gauges and is adapted to be mounted on the metal wheel of a respective one of the pneumatic tires so as to secure the respective one of the pressure gauges on the metal wheel of the respective one of the pneumatic tires. Preferably, the coupling tube is in fluid communication with the aperture in the casing of the pressure gauge, and each of the coupling seats has a bottom end which forms a clearance with the metal wheel of the respective one of the pneumatic tires to permit entry of the pressure in the respective one of the pneumatic tires into the aperture of the casing of the respective one of the pressure gauges via the coupling tube.

BRIEF DESCRIPTION OF THE DRAWINGS

Other features and advantages of the present invention will become apparent in the following detailed description of the preferred embodiments, with reference to the accompanying drawings, of which.

DESCRIPTION OF THE PREFERRED EMBODIMENTS

Figure 1:
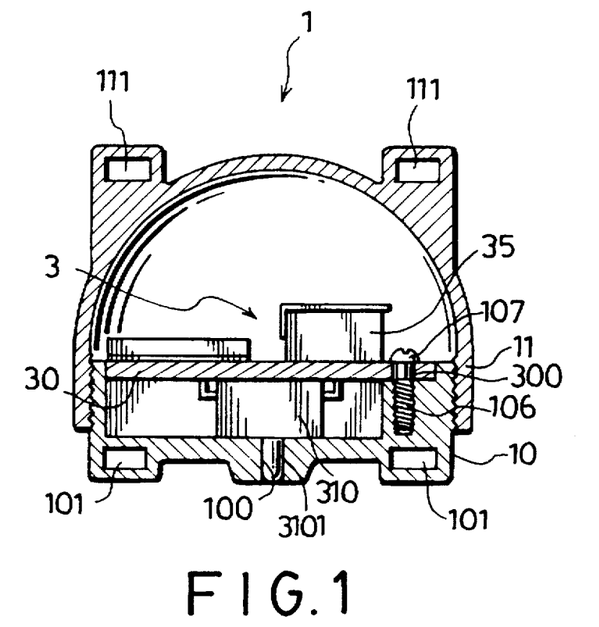
FIG. 1 is a sectional view of a pressure gauge of the first preferred embodiment of a tire pressure indicator according to the present invention.
Figure 6:
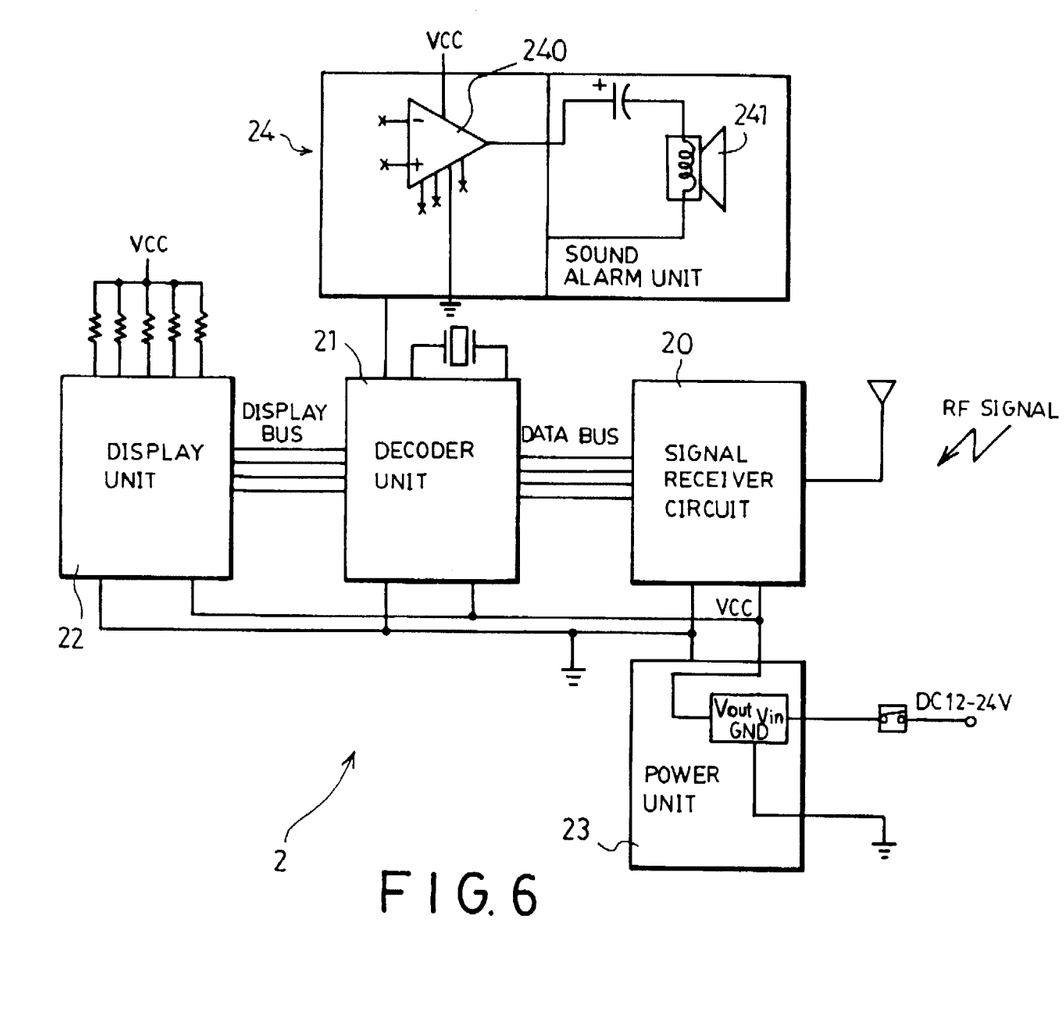
FIG. 6 is a schematic circuit block diagram of a receiver device of the first preferred embodiment.

Referring to FIGS. 1 and 6, the preferred embodiment of a tire pressure indicator according to the present invention is shown to comprise a plurality of pressure gauges 1 (only one being shown) and a receiver device 2. Each of the pressure gauges 1 is adapted to be secured to a metal wheel 400 of a respective one of the pneumatic tires 40 of a vehicle (see FIG. 4) and comprises a casing having a hollow base 10 and a cap 11, and a signal generating device 3 disposed in the casing.

The hollow base 10 has a first end formed with an aperture 100 to permit the entry of pressure in the respective one of the pneumatic tires into the hollow base 10. The cap 11 has a round closed end and an internally threaded open end which threadedly couples with an open second end of the hollow base 10. Each of the first end of the hollow base 10 and the closed end of the cap 11 is formed with a pair of retaining holes 101, 111, the purpose of which will be detailed hereinafter.

The signal generating device 3 of each pressure gauge wirelessly transmits a pressure signal when the pressure within the respective one of the pneumatic tires is not within a predetermined normal operating pressure range. The signal generating device 3 is similar to that employed in the co-pending U.S. patent application Ser. No. 08/773,000, filed on Dec. 23, 1996 by the applicant, the entire disclosure of which is incorporated herein by reference. As shown in FIG. 1, the signal generating device 3 includes a circuit board 30 which is provided with several mounting holes 300

Figure 2:
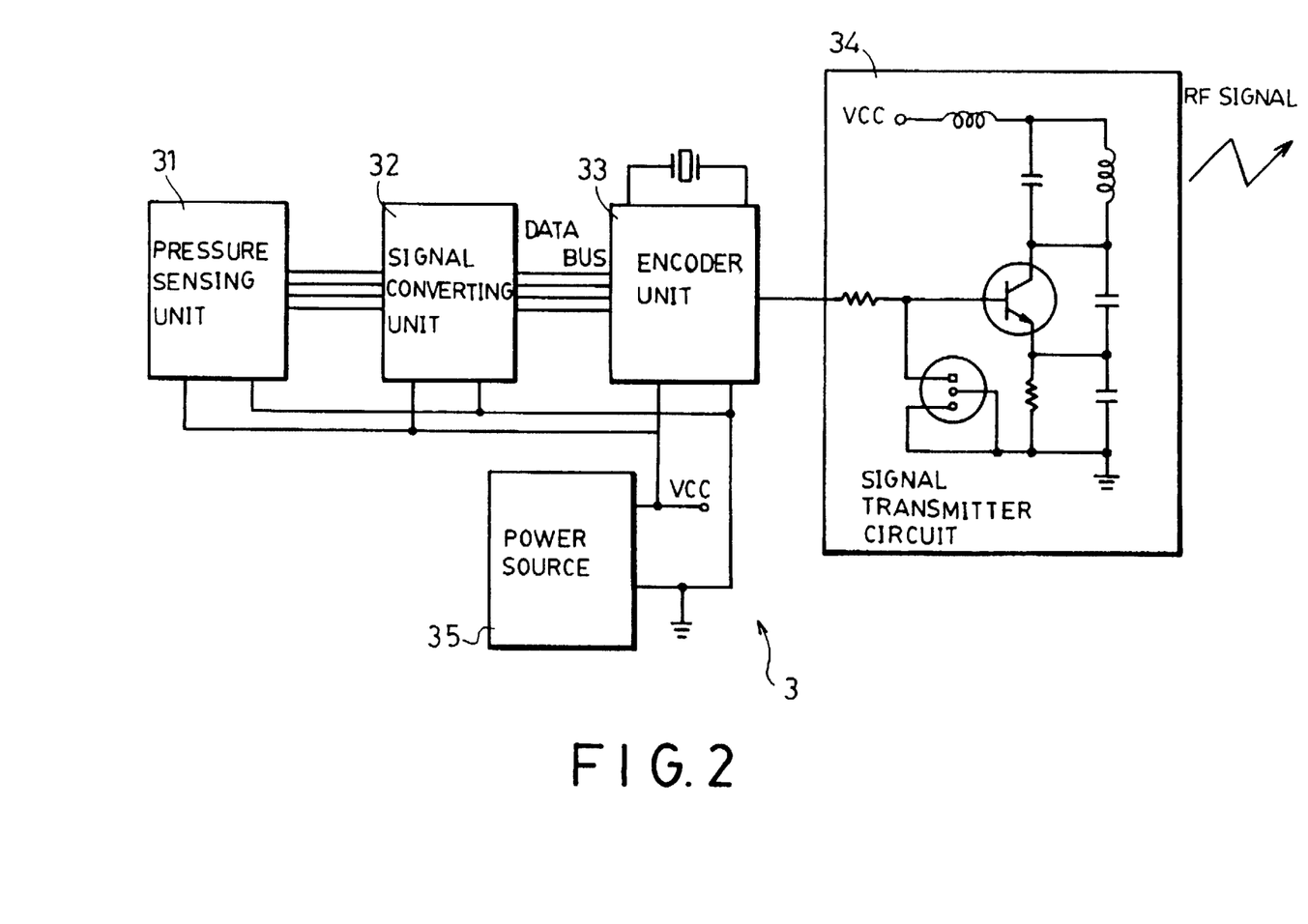
FIG. 2 is a schematic circuit block diagram of a signal generating device of the pressure gauge shown in FIG. 1.

(only one is shown) to be aligned with screw sockets 106 formed in the hollow base 10. Bolts 107 (only one is shown) extend through the mounting holes 300 of the circuit board 30 and engage the screw sockets 106 to fasten the circuit board 30 onto the hollow base 10. Referring to FIGS. 1 and 2, the signal generating device 3 further includes a pressure sensing unit 31, a signal converting unit 32, an encoder unit 33, a signal transmitter circuit 34 and an electric power source 35 mounted on the circuit board 30.

Figure 3:
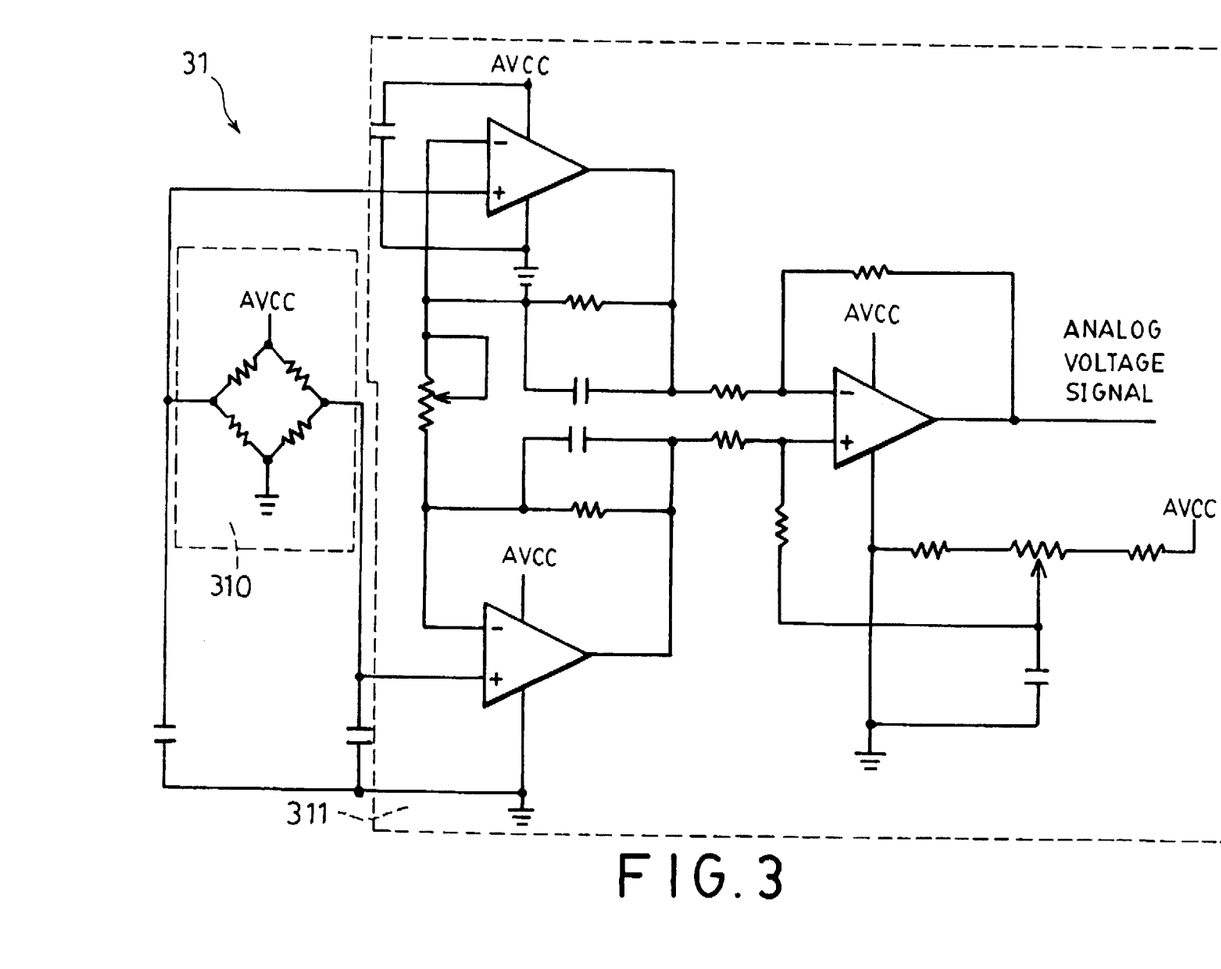
FIG. 3 is a schematic circuit diagram of a pressure sensing unit of the signal generating device.

Referring to FIG. 3, the pressure sensing unit 31 includes a pressure sensor 310 and an amplifier circuit 311. The pressure sensor 310 is a semiconductor pressure sensor, such as the ADP1 DIP type pressure sensor manufactured by Matsushita Electric Works under the brand name NAIS. As shown in FIG. 1, the pressure sensor 310 is mounted on one side of the circuit board 30 and has a tubular pressure port 3101 which extends into the aperture 100. The pressure sensor 310 generates an analog voltage signal which varies in accordance with the pressure entering into the pressure port 3101. The amplifier circuit 311 is electrically connected to the pressure sensor 310 and amplifies the analog voltage signal from the latter.

Referring once more to FIG. 2, the signal converting unit 32 is electrically connected to the pressure sensing unit 31 and serves to convert the analog voltage signal of the latter into a digital output signal. The encoder unit 33 is electrically connected to the signal converting unit 32 and receives the digital output signal of the latter. The encoder unit 33, which may be implemented using an Applications Specific Integrated Circuit (ASIC) or a microprocessor, compares the digital output signal of the signal converting unit 32 with low pressure and high pressure limits of the predetermined normal operating pressure range. The encoder unit 33 generates the pressure signal which includes the digital output signal and an identification code unique to that gauge 1 when the digital output signal is not within the normal operating pressure range. No pressure signal is generated when the digital output signal is between the low pressure and high pressure limits, indicating that the pressure entering into the pressure port 3101 is within the normal operating pressure range. The pressure signal is preferably in the form of a digital pulse signal. The signal transmitter circuit 34 is electrically connected to the encoder unit 33 and receives the pressure signal therefrom. The signal transmitter circuit 34 serves to transmit the pressure signal wirelessly in the form of a radio frequency (RF) signal for reception by the receiver device 2 (see FIG. 6).

Referring again to FIG. 1, the power source 35 may include two lithium button cells or two mercury button cells (only one is shown) connected in series and provided on the circuit board 30. The power source 35 supplies the electric power required by the signal generating device 3.

Figure 4:
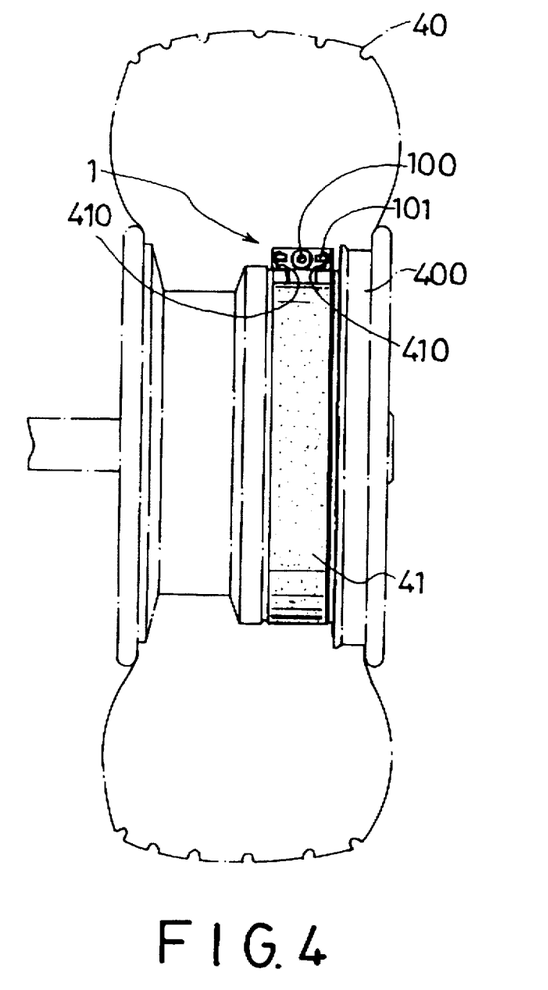
FIG. 4 is a schematic partly sectional view illustrating the pressure gauge of FIG. 1 secured to a metal wheel of a pneumatic tire.
Figure 5:
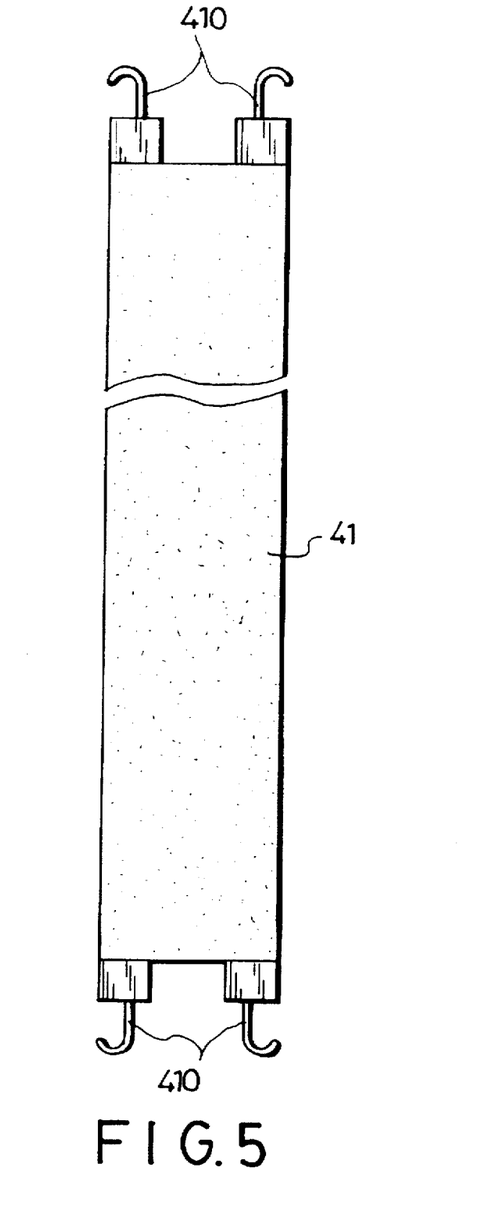
FIG. 5 illustrates an elastic strap used to secure the pressure gauge of FIG. 1 to the metal wheel of the pneumatic tire.

Referring to FIG. 4, each of the pressure gauges 1 is secured to the metal wheel 400 of the respective one of the pneumatic tires 40 by means of an elastic strap 41 which extends around the metal wheel 400. As shown in FIG. 5, the elastic strap 41 has opposite ends formed with a pair of hook units 410 which engage the retaining holes 101, 111 on the casing of a respective one of the pressure gauges 1 (see FIG. 1) for securing the latter to the metal wheel 400 of the respective one of the pneumatic tires 40.

The receiver device 2, which receives the RF signal transmitted by the signal generating device 3 of the pressure gauges 1, may be built as a part of the instrument panel of the vehicle or as a separate device to be installed in the driver room of the vehicle. The receiver device 2 is also similar to that employed in the co-pending U.S. patent application Ser. No. 08/773,000 now U.S. Pat. No. 5,694,111, and provides information to the driver concerning the status of the different tires of the vehicle. Referring to FIG. 6, the receiver device 2 includes a signal receiver circuit 20, a decoder unit 21 electrically connected to the signal receiver circuit 20, a display unit 22 electrically connected to the decoder unit 21, a power unit 23, and a sound alarm unit 24 electrically connected to the decoder unit 21.

The signal receiver circuit 20 receives and demodulates the RF signals transmitted by the pressure gauges 1 and provides the same to the decoder unit 21. The decoder unit 21 may be implemented using an Applications Specific Integrated Circuit (ASIC) or a microprocessor. The display unit 22, which may be a liquid crystal display or a light emitting diode (LED) display, is controlled by the decoder unit 21 so as to indicate thereon which one of the tires is under- or over-inflated and the pressure inside the under- or over-inflated one of the tires. The sound alarm unit 24 includes a sound amplifier circuit 240 and a loudspeaker 241 driven by the sound amplifier circuit 240. The sound alarm unit 24 is controlled by the decoder unit 21 so as to generate an audible alarm output for informing the driver of the vehicle as to which one of the tires is under- or over-inflated. The power unit 23 is preferably connected to a 12–24 volt DC battery of the vehicle and supplies the electric power required by the receiver device 2.

It should be noted that it is not necessary for the receiver device 2 to have both the display unit 22 and the sound alarm unit 24. The receiver device 2 is operable even though only one of the display unit 22 and the sound alarm unit 24 is present.

Figure 7:
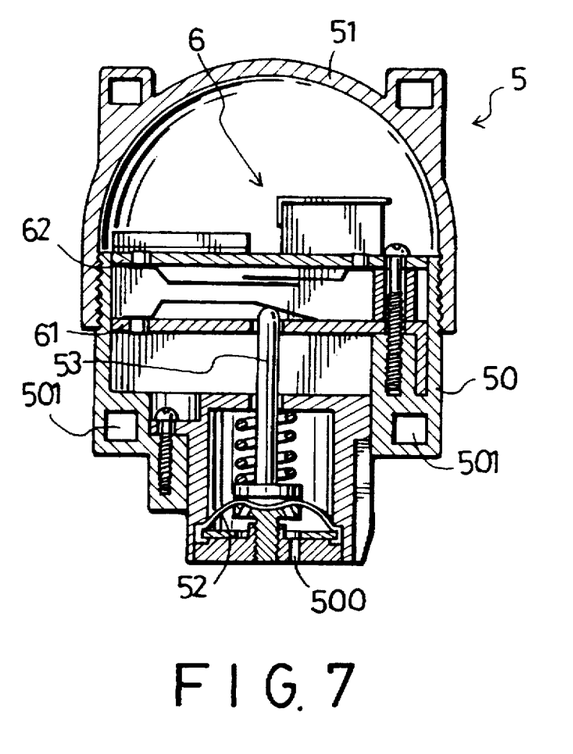
FIG. 7 is a sectional view of a pressure gauge of the second preferred embodiment of a tire pressure indicator according to the present invention.

FIG. 7 illustrates a pressure gauge 5 of the second preferred embodiment of a tire pressure indicator according to the present invention. As shown, the pressure gauge 5 comprises a casing having a hollow base 50 and a cap 51, and a signal generating device 6 disposed in the casing.

The hollow base 50 has a first end formed with an aperture 500 to permit the entry of the pressure in the respective pneumatic tire into the hollow base 50. The cap 51 has a round closed end and an internally threaded open end which threadedly couples with an open second end of the hollow base 50. A diaphragm 52 is disposed inside the casing adjacent to the aperture 500 and is movable, in response to the pressure entering the aperture 500, between a first position in which the pressure is below a predetermined low pressure limit and a second position in which the pressure is above a predetermined high pressure limit. A spring-loaded push rod 53 is movably mounted inside the casing and is moved by the diaphragm 52. The signal generating device 6 is similar to that employed in U.S. Pat. No. 5,289,161 and includes first and second switch devices 61, 62 which are controlled by the movement of the push rod 53. The first switch device 61 is active so that the signal generating device 6 transmits a first code unique to that gauge 5 when the diaphragm 52 is in the first position. The second switch device 62 is active so that the signal generating device 6 transmits a second code unique to that gauge 5 when the diaphragm 52 is in the second position. A receiver device (not shown) receives the first and second codes transmitted by the signal generating device 6, and indicates which one of the tires is under- or over-inflated.

As with the previous embodiment, the casing of the pressure gauge 5 is formed with retaining holes 501 for engaging the hook units 410 on opposite ends of a corresponding elastic strap 41 (see FIG. 5) so that the pressure gauge 5 can be secured to the metal wheel of the respective pneumatic tire in the manner described beforehand.

Figure 8:
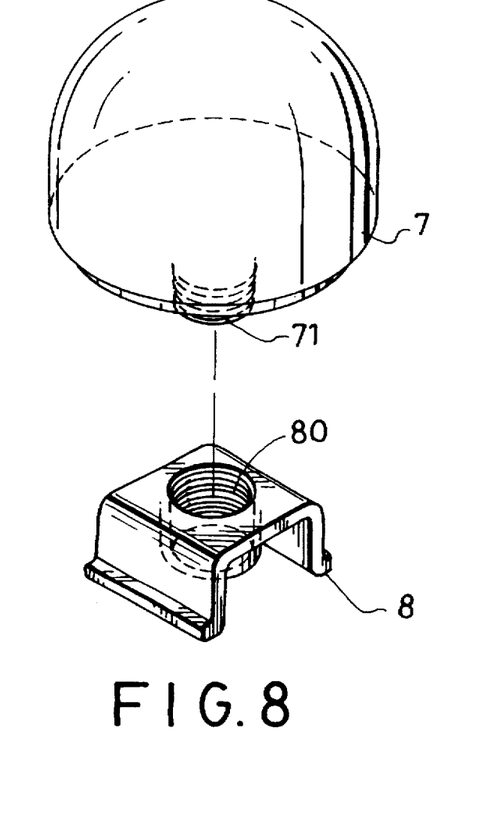
FIG. 8 is a partly exploded view illustrating a modified pressure gauge and a coupling seat of a tire pressure indicator according to the present invention.
Figure 9:
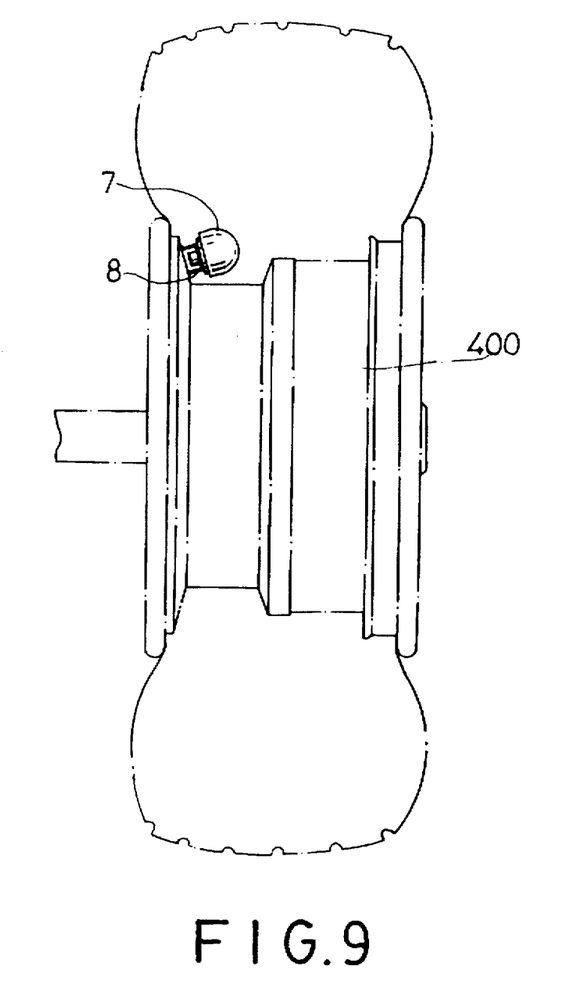
FIG. 9 is a schematic partly sectional view illustrating how the coupling seat secures the pressure gauge of FIG. 8 to a metal wheel of a pneumatic tire in accordance with the present invention.

The method of securing the pressure gauges 1, 5 on the metal wheels of the pneumatic tires should not be limited to the elastic strap 41 used in the preceding embodiments. As shown in FIGS. 8 and 9, the casings of the pressure gauges of the previous embodiments may be modified by providing the same with an externally threaded coupling tube 71 that is in fluid communication with the aperture (not shown). A coupling seat 8 is formed with an internally threaded hole 80 for engaging the coupling tube 71 and is welded onto the metal wheel 400, e.g. on a rim flange of the latter, such that the bottom ends of the coupling tube 71 and the coupling seat 8 form a clearance with the metal wheel 400 to permit entry of the pressure in the respective pneumatic tire 40 into the aperture of the casing of the pressure gauge 7 via the coupling tube 71.

Since the pressure gauges of this invention are concealed by the pneumatic tires, impact to the pressure gauges can be avoided, and loss or stealing of the pressure gauges can be prevented.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A tire pressure indicator for a set of pneumatic tires of a vehicle, each of the pneumatic tires having a metal wheel, said tire pressure indicator comprising:

a plurality of pressure gauges, each of which includes a casing formed with an aperture and adapted to be secured to the metal wheel of a respective one of the pneumatic tires such that said pressure gauges are concealed by the pneumatic tires, and a signal generating device disposed in said casings said signal generating device wirelessly transmitting a pressure signal when pressure within the respective one of the pneumatic tires is not within a predetermined normal operating pressure range;

a receiver device for receiving the pressure signal transmitted by said signal generating device of said pressure gauges;

a pressure sensing unit which generates an analog voltage signal that varies in accordance with the pressure entering said aperture:

a signal converting unit electrically connected to said pressure sensing unit for converting the analog voltage signal into a digital output signal:

an encoder unit electrically connected to said signal converting unit, said encoder unit comparing the digital output signal of said signal converting unit with high pressure and low pressure limits of the normal operating pressure and low pressure limits of the normal operating pressure range, said encoder unit generating said pressure signal which includes the digital output signal and an identification code unique to that gauge when the digital output signal is not within the normal operating pressure range: and a signal transmitter circuit electrically connected to said encoder unit for transmitting the pressure signal from said encoder unit wirelessly.

2. The tire pressure indicator of claim 1, further comprising a plurality of elastic straps, each of which is adapted to be extended around the metal wheel of a respective one of the pneumatic tires and secures said casing of a respective one of said pressure gauges on the metal wheel of the respective one of the pneumatic tires.

3. The tire pressure indicator of claim 2, wherein each of said elastic straps has opposite ends that are provided with hook units, and said casing of each of said pressure gauges is formed with retaining holes for engaging said hook units on the respective one of said elastic straps.

4. The tire pressure indicator of claim 1, wherein said casing of each of said pressure gauges is provided with an externally threaded coupling tube, said tire pressure indicator further comprising a plurality of coupling seats, each of which is formed with an internally threaded hole for engaging said coupling tube on said casing of a respective one of said pressure gauges and is adapted to be mounted on the metal wheel of a respective one of the pneumatic tires so as to secure the respective one of said pressure gauges on the metal wheel of the respective one of the pneumatic tires.

5. The tire pressure indicator of claim 4, wherein said coupling tube is in fluid communication with said aperture in said casing of said pressure gauge, and each of said coupling seats has a bottom end which forms a clearance with the metal wheel of the respective one of the pneumatic tires to permit entry of the pressure in the respective one of the pneumatic tires into said aperture of said casing of the respective one of said pressure gauges via said coupling tube.

6. The tire pressure indicator of claim 1, wherein said receiver device includes a signal receiver circuit for receiving the pressure signal transmitted by said signal generating device of said pressure gauges, a decoder unit electrically connected to said signal receiver circuit so as to receive the pressure signal therefrom, and a display unit electrically connected to said decoder unit and controlled by said decoder unit so as to indicate thereon which one of the pneumatic tires is under- or over-inflated and the pressure inside the under- or over-inflated one of the pneumatic tires.

7. The tire pressure indicator of claim 6, wherein the display unit includes a liquid crystal display.

8. The tire pressure indicator of claim 6, wherein the display unit includes a diode display.

9. The tire pressure indicator of claim 1, wherein said receiver device includes a signal receiver circuit for receiving the pressure signal transmitted by said signal generating device of said pressure gauges, a decoder unit electrically connected to said signal receiver circuit so as to receive the pressure signal therefrom, and a sound alarm unit electrically connected to said decoder unit and controlled by said decoder unit so as to generate an audible alarm output.

10. The tire pressure indicator of claim 1, wherein said pressure sensing unit of said signal generating device of each of said pressure gauges includes a semiconductor pressure sensor with a pressure port that extends into said aperture.

11. The tire pressure indicator of claim 1, wherein said signal generating device of each of said pressure gauges further includes a circuit board which is mounted inside said casing which has said pressure sensing unit, said signal converting unit and said encoder unit mounted thereon.

12. A pressure gauge for a pneumatic tire with a metal wheel comprising:

a casing formed with an aperture and adapted to be secured to the metal wheel of the pneumatic tire such that said casing is concealed by the pneumatic tire;

a signal generating device disposed in said casing, said signal generating device wirelessly transmitting a pressure signal when pressure within the pneumatic tire is not within a predetermined normal operating pressure range;

a pressure sensing unit which generates an analog voltage signal that varies in accordance with the pressure entering said aperture;

a signal converting unit electrically connected to said pressure sensing unit for converting the analog voltage signal into a digital output signal;

an encoder unit electrically connected to said signal converting unit, said encoder unit comparing the digital output signal of said signal converting unit with high pressure and low pressure limits of the normal operating pressure range, said encoder unit generating said pressure signal which includes the digital output signal and an identification code unique to that gauge when the digital output signal is not within the normal operating pressure range;

a signal transmitter circuit electrically connected to said encoder unit for transmitting the pressure signal from said encoder unit wirelessly.

13. The pressure gauge of claim 12, further comprising an elastic strap which is adapted to be extended around the metal wheel of the pneumatic tire so as to secure said casing on the metal wheel.

14. The pressure gauge of claim 13, wherein said elastic strap has opposite ends that are provided with hook units, and said casing is formed with retaining holes for engaging said hook units on said elastic strap.

15. The pressure gauge of claim 12, wherein said casing is provided with an externally threaded coupling tube, said pressure gauge further comprising a coupling seat formed with an internally threaded hole for engaging said coupling tube on said casing and adapted to be mounted on the metal wheel of the pneumatic tire so as to secure said casing on the metal wheel.

16. The pressure gauge of claim 15, wherein said coupling tube is in fluid communication with said aperture in said casing, and said coupling seat has a bottom end which forms a clearance with the metal wheel to permit entry of the pressure in the pneumatic tire into said aperture of said casing via said coupling tube.

17. The pressure gauge of claim 12, wherein said pressure sensing unit of said signal generating device includes a semiconductor pressure sensor with a pressure port that extends into said aperture.

18. The pressure gauge of claim 12, wherein said signal generating device further includes a circuit board which is mounted inside said casing which has said pressure sensing unit, said signal converting unit and said encoder unit mounted thereon.

* * * * *

UNITED STATES PATENT AND TRADEMARK OFFICE
CERTIFICATE OF CORRECTION

PATENT NO. : 5,798,689
DATED      : August 25, 1998
INVENTOR(S): Tien-Tsai HUANG It is certified that error appears in the above-identified patent and that said Letters Patent is hereby corrected as shown below:

On the Title page, Item [63], Related U.S. Application Data is incorrect. It should be:

--Continuation-in-part of Ser. No. 773,000,
   Dec. 23, 1996, Pat No. 5,694,111.--

Signed and Sealed this

Sixteenth Day of March, 1999

Attest:

Q. TODD DICKINSON

Attesting Officer

Acting Commissioner of Patents and Trademarks